US012569767B2

(12) United States Patent
Chen

(10) Patent No.: US 12,569,767 B2
(45) Date of Patent: Mar. 10, 2026

(54) METHOD FOR DISPLAYING VIRTUAL TRANSACTION NODE, AND ELECTRONIC DEVICE AND STORAGE MEDIUM THEREOF

(71) Applicant: NETEASE (HANGZHOU) NETWORK CO., LTD., Hangzhou (CN)

(72) Inventor: Siqi Chen, Hangzhou (CN)

(73) Assignee: NETEASE (HANGZHOU) NETWORK CO., LTD., Hangzhou (CN)

( * ) Notice: Subject to any disclaimer, the term of this patent is extended or adjusted under 35 U.S.C. 154(b) by 107 days.

(21) Appl. No.: 18/567,383

(22) PCT Filed: May 19, 2022

(86) PCT No.: PCT/CN2022/093887
§ 371 (c)(1),
(2) Date: Dec. 6, 2023

(87) PCT Pub. No.: WO2023/024603
PCT Pub. Date: Mar. 2, 2023

(65) Prior Publication Data
US 2024/0278128 A1 Aug. 22, 2024

(30) Foreign Application Priority Data

Aug. 26, 2021 (CN) .......................... 202110987783.7

(51) Int. Cl.
*A63F 13/56* (2014.01)
(52) U.S. Cl.
CPC ..................................... *A63F 13/56* (2014.09)
(58) Field of Classification Search
CPC ........ A63F 13/25; A63F 13/426; A63F 13/47; A63F 13/50; A63F 13/52; A63F 13/56;
(Continued)

(56) References Cited

U.S. PATENT DOCUMENTS 8,142,286 B2 3/2012 Sayyadi et al.
9,737,819 B2 8/2017 Desanti et al.
(Continued)

FOREIGN PATENT DOCUMENTS

CN 1932799 A 3/2007
CN 102625938 A 8/2012
(Continued)

OTHER PUBLICATIONS

1st Office Action dated Dec. 12, 2022 of Chinese Application No. 202110987783.7.
(Continued)

*Primary Examiner* — Omkar A Deodhar
(74) *Attorney, Agent, or Firm* — Qinghong Xu

(57) ABSTRACT

The present disclosure provides a method for displaying a virtual transaction node, an electronic device and a computer-readable storage medium. The method includes: providing, by a terminal device, a graphical user interface, wherein the graphical user interface displays a virtual character in a game scene; entering a browse mode in response to a browse mode switch command, and determining a movement path of the virtual character in the game scene in the browse mode; acquiring at least one virtual transaction node in the game scene, and determining object information of the at least one virtual transaction node; controlling the virtual character to move at a preset speed in the game scene according to the movement path; and displaying, according to a real-time movement position of the virtual character, the object information of the at least one virtual transaction node along the movement path.

20 Claims, 10 Drawing Sheets

(58) Field of Classification Search

CPC ............... A63F 13/58; A63F 2300/306; A63F 2300/5573; A63F 2300/577; A63F 2300/632; A63F 2300/6684

See application file for complete search history.

(56) References Cited

U.S. PATENT DOCUMENTS

| | | | |
|---|---|---|---|
| 2003/0216177 | A1 | 11/2003 | Aonuma et al. |
| 2010/0304859 | A1 | 12/2010 | Yamada et al. |
| 2011/0050732 | A1* | 3/2011 | Arrasvuori ............. G06Q 50/00 |
| | | | 709/204 |
| 2017/0116667 | A1* | 4/2017 | High ..................... G06T 19/006 |
| 2018/0025415 | A1 | 1/2018 | Engel et al. |
| 2020/0316473 | A1 | 10/2020 | Qiu et al. |
| 2021/0299562 | A1* | 9/2021 | Zhou ................... A63F 13/5378 |
| 2022/0080299 | A1* | 3/2022 | Huang .................. A63F 13/537 |

FOREIGN PATENT DOCUMENTS

| | | | |
|---|---|---|---|
| CN | 104156897 | A | 11/2014 |
| CN | 108022303 | A | 5/2018 |
| CN | 109272380 | A | 1/2019 |
| CN | 109876442 | A | 6/2019 |
| CN | 109993631 | A | 7/2019 |
| CN | 111530073 | A | 8/2020 |
| CN | 111815419 | A | 10/2020 |
| CN | 112691372 | A | 4/2021 |
| CN | 112915537 | A | 6/2021 |
| CN | 113680070 | A | 11/2021 |
| CN | 113786621 | A | 12/2021 |
| JP | 2003000940 | A | 1/2003 |
| KR | 20060024524 | A | 3/2006 |

OTHER PUBLICATIONS

International Search Report dated Aug. 17, 2022 of International Application No. PCT/CN2022/093893.
International Search Report dated Aug. 19, 2022 of International Application No. PCT/CN2022/093887.
1st Office Action dated Dec. 22, 2023 for Chinese Application No. 202110987821.9.
Non-Final OA dated Nov. 4, 2025 of U.S. Appl. No. 18/291,608.

* cited by examiner

800

900

METHOD FOR DISPLAYING VIRTUAL TRANSACTION NODE, AND ELECTRONIC DEVICE AND STORAGE MEDIUM THEREOF

CROSS-REFERENCE TO RELATED APPLICATIONS

The present disclosure is a U.S. national phase application of International Application No. PCT/CN2022/093887, filed on May 19, 2022, which is based on and claims priority to Chinese Patent Application No. 202110987783.7, filed on Aug. 26, 2021, titled "METHOD AND APPARATUS FOR BROWSING VIRTUAL TRANSACTION NODE, AND ELECTRONIC DEVICE AND STORAGE MEDIUM", the entire contents of both of which are incorporated herein by reference for all purposes.

TECHNICAL FIELD

The present disclosure relates to the field of information technology and, in particular, to a method for displaying a virtual transaction node based on information technology, an electronic device, and a computer-readable storage medium.

BACKGROUND

With the development of information technology, more and more users begin to use terminal devices, such as smart phones, that are capable of installing and running application programs to fulfill their personal entertainment needs. However, how to ensure and enhance the user's immersion in the entertainment process is a problem that developers have been working on for a long time.

It should be noted that the information disclosed above in the background section is only intended to enhance the understanding of the background of the present disclosure, and therefore, information that does not constitute the prior art known to those of ordinary skill in the art may be included.

SUMMARY

The present disclosure provides a method for displaying a virtual transaction node, an electronic device, and a computer-readable storage medium.

According to one aspect of the present disclosure, a method for displaying a virtual transaction node is provided, in which a graphical user interface is provided by a terminal device, and the graphical user interface displays at least a virtual character in a game scene. The method includes:

switching to a browse mode in response to a browse mode switch command, and determining a movement path of the virtual character in the game scene;

acquiring at least one virtual transaction node in the game scene, and determining object information of the at least one virtual transaction node;

controlling the virtual character to move at a preset speed in the game scene according to the movement path; and displaying, according to a real-time movement position of the virtual character, the object information of the at least one virtual transaction node along the movement path.

According to one aspect of the present disclosure, an electronic device is provided, including: a processor; and a memory for storing instructions executable by the processor; wherein the processor is configured to: provide a graphical user interface, wherein the graphical user interface displays at least a virtual character in a game scene; enter a browse mode in response to a browse mode switch command, and determine a movement path of the virtual character in the game scene in the browse mode; acquire at least one virtual transaction node in the game scene, and determine object information of the at least one virtual transaction node; control the virtual character to move at a preset speed in the game scene according to the movement path; and display, according to a real-time movement position of the virtual character, the object information of the at least one virtual transaction node along the movement path.

According to one aspect of the present disclosure, there is provided a non-transitory computer-readable storage medium having stored thereon a computer program, wherein the computer program, when executed by a processor, causes the processor to: provide a graphical user interface, wherein the graphical user interface displays at least a virtual character in a game scene; enter a browse mode in response to a browse mode switch command, and determine a movement path of the virtual character in the game scene in the browse mode; acquire at least one virtual transaction node in the game scene, and determine object information of the at least one virtual transaction node; control the virtual character to move at a preset speed in the game scene according to the movement path; and display, according to a real-time movement position of the virtual character, the object information of the at least one virtual transaction node along the movement path.

It should be understood that both the foregoing general description and the following detailed description are merely exemplary and explanatory and do not limit the present disclosure.

DETAILED DESCRIPTION

Figure 1A:
FIG. 1A is an interface diagram of a display mode of stalls in a game according to the related art.

Embodiments are now described more fully with reference to the accompanying drawings. However, these embodiments may be implemented in a variety of forms and should not be construed as being limited to the examples set forth herein; rather, these embodiments are provided so that the present disclosure will be more comprehensive and complete and will fully convey the concept of the embodiments to those skilled in the art. The features, structures, or characteristics described may be combined in one or more embodiments in any suitable manner. In the following description, numerous specific details are provided to give a full understanding of the embodiments of the present disclosure. However, those skilled in the art will appreciate that the technical solutions of the present disclosure may be practiced by omitting one or more of the specific details, or by using other methods, components, devices, steps, etc. In other instances, well-known technical solutions are not shown or described in detail to avoid becoming the focus of the present disclosure and obscuring various aspects of the present disclosure.

Furthermore, the drawings are merely schematic illustrations of the present disclosure and are not necessarily drawn to scale. The same reference numerals in the drawings denote the same or similar parts, and thus repeated descriptions thereof will be omitted. Some of the block diagrams shown in the drawings are functional entities and do not necessarily correspond to physically or logically separate entities. These functional entities may be implemented in software, or in one or more hardware modules or integrated circuits, or in different networks and/or processor devices and/or microcontroller devices.

The present disclosure relates to a method for displaying a virtual transaction node, which may be applied to a terminal device capable of presenting a graphical user interface and running a game program, such as a smart phone, a tablet computer, a personal computer, and the like. In the game program, since a user may offer virtual props and trade with other users at a virtual transaction node set up by the user, which is similar to a function realized by a stall in a market in reality, "stall" will be used as an example of "virtual transaction node" for illustration in the following description, in order to facilitate understanding. Similarly, the terms used such as "stall setting", "strolling around stalls" and so on may refer to relevant interaction actions performed in the game corresponding to the "stall". In addition, the "virtual transaction node" may also be implemented in other ways than the "stall", which is not particularly limited in this exemplary embodiment.

Taking a game program as an example, the transaction of virtual props may be involved in the game, so the "stall setting" function was emerged. For example, a user may set up his/her own "stall" in a game scene, and offer virtual props at the stall for trading with other users. At present, it is usually the program itself that obtains all the stall information within a certain range in the game scene and presents it to the user in the form of a list, and the user browses the store by scrolling through the pages to view the information about each stall. This method causes the user to leave the game scene and enter the store's browsing interface to view the stall information, thereby interrupting the user's game experience and resulting in poor game immersion.

Figure 1B:
FIG. 1B is an interface diagram of a display mode of stalls in a game according to the related art.

In related art which is related to virtual transaction node displaying, as shown in FIGS. 1A and 1B, the game program may collect all the stall information within a certain range in the game scene, and display it to the user in the form of a list of objects (or items) in a store. This way requires the user to leave the current game interface and enter the store's browsing interface to scroll through the pages to view the stall information, resulting in a serious detachment of the user from the immersion experience of the game in the process of browsing the virtual transaction node, which prevents the user from obtaining a good sense of immersion.

The method for displaying a virtual transaction node in one of the embodiments of the present disclosure may run on a terminal device or a server. The terminal device may be a local terminal device. When the method for displaying a virtual transaction node runs on the server, the method may be realized and executed based on a cloud interactive system, wherein the cloud interactive system includes a server and a client device.

In an embodiment, various cloud applications, such as cloud games, can run under the cloud interactive system. Taking a cloud game as an example, the cloud game refers to a game method based on cloud computing. In an operating mode of the cloud game, the main body for running the game program and the main body for presenting the game screen are separated. The storage and running of the method for displaying a virtual transaction node are completed on the cloud game server. The client device is used for receiving and sending data, and presentation of game screens. For example, the client device may be a display device with data transmission function close to the user side, such as a mobile terminal, TV, computer, palmtop computer, etc.; but the terminal device that performs information processing is the cloud game server in the cloud. When playing a game, the player operates the client device to send an operation command to the cloud game server, the cloud game server runs the game according to the operation command, encodes and compresses the data such as the game screens, and returns it to the client device through the network, and finally the client device conducts decoding and outputs the game screens.

In an embodiment, the terminal device may be a local terminal device. Taking a game as an example, the local terminal device stores a game program and is used to present game screens. The local terminal device is used to interact with the player through the graphical user interface, i.e., the conventional way for downloading and installing a game program on an electronic device and running it. The local terminal device may provide the graphical user interface to the player in various manners, for example, rendering and displaying it on a display screen of the terminal, or providing it to the player through holographic projection. For example, the local terminal device may include a display screen and a processor, the display screen is used to present the graphical user interface, the graphical user interface including a game screen, and the processor is used to run the game, generate the graphical user interface, and control the display of the graphical user interface on the display screen.

In an embodiment, the embodiment of the present disclosure provides a method for displaying a virtual transaction node, in which a graphical user interface is provided through a terminal device. The terminal device may be the above local terminal device or the above client device in the cloud interactive system.

The technical solutions of the embodiment of the present disclosure are described in detail below.

Figure 2:
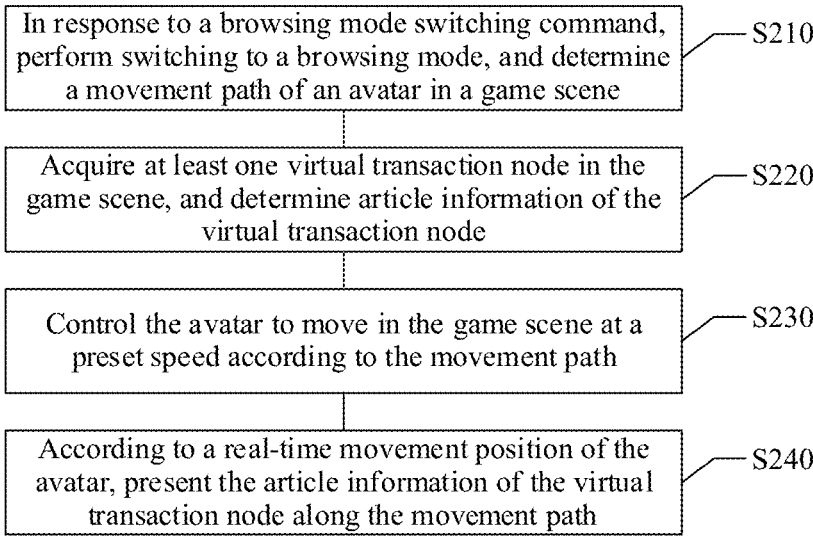
FIG. 2 is a flowchart of a method for displaying a virtual transaction node according to one or more embodiments of the present disclosure.

This embodiment provides a method for displaying a virtual transaction node, in which a graphical user interface is provided through a terminal device, and the graphical user interface displays at least a virtual character that is within a game scene. Referring to FIG. 2, the method for displaying a virtual transaction node may include the following steps S210 to S240.

Step S210, switching to a browse mode in response to a browse mode switch command, and determining a movement path of the virtual character in the game scene.

Step S220, acquiring at least one virtual transaction node in the game scene, and determining object information of the at least one virtual transaction node.

Step S230, controlling the virtual character to move at a preset speed in the game scene according to the movement path.

Step S240, displaying, according to a real-time movement position of the virtual character, the object information of the at least one virtual transaction node along the movement path.

In the method for displaying a virtual transaction node provided by this embodiment of the present disclosure, on the one hand, the virtual transaction node in the game is displayed along the movement path of the virtual character, so that the user can have a realistic experience of shopping and viewing stalls in the game scene similar to that in real life, which realizes the experience of "buying while strolling" similar to reality, and in turn, helps to improve the user's game immersion. On the other hand, the object information of the virtual transaction node is displayed in a regular manner along the virtual character's movement path within the game scene, which avoids the need for the user to detach from the game scene and enter the store's browsing interface to view the stall information, and further improves the user's immersion.

The above steps are described in more detail below in another embodiment.

In step S210, the terminal device switches to the browse mode in response to the browse mode switch command, and determines that the movement path of the virtual character in the game scene.

Figure 3:
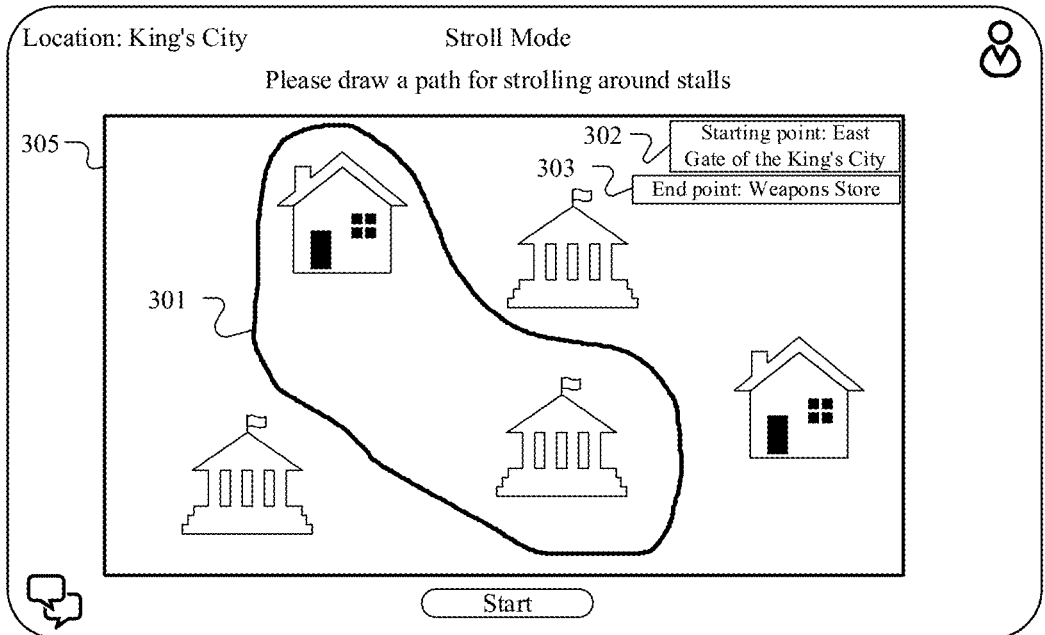
FIG. 3 is an interface diagram in a browse mode according to one or more embodiments of the present disclosure.

In this embodiment, the user may actively input a browse mode switch command through a switch button such as "Stroll Mode" on the game interface. Upon detecting the browse mode switch command, the terminal device may, for example, switch to the browse mode. In an example as shown in FIG. 3, after switching to the browse mode, e.g., named "Stroll Mode" in the game, a thumbnail map 305 of the current game scene may be generated on the interface, so that the user is able to determine the movement path of the virtual character for strolling around the stalls in the game scene through the thumbnail map 305.

In an example, the terminal device may determine the movement path by receiving path information input by the user. In a further example, the path information may include, for example, information on a path line drawn by the user or start and end point information input by the user. For example, in order to obtain an immersion experience corresponding to strolling around the stalls in reality, a movement path 301 of the virtual character of the game in the game scene may be determined by the user on the thumbnail map 305 in the browse mode, as shown in FIG. 3, to simulate the process of buyer shopping and viewing various stalls according to his/her purchase plan in reality. The user may determine where in the current game scene the stalls of interest may be distributed, and may then draw by himself/ herself the path line 301 that the virtual character is going to move through, e.g., by manually touch-drawing or dragging the mouse, on the thumbnail map 305 in the browse mode.

In addition, the user may, for example, input positions at start and end points of the movement path for strolling around the stalls in a start position input box 302 and an end position input box 303 provided in the browse mode, respectively. The positions at the start and end points may be the names of specific places in the game scene, such as the East Gate of the King's City and the Weapon store shown in FIG. 3. Furthermore, the user may, for example, click on a specific place in the thumbnail map 305 to obtain the name of the place or set it as the position at the start point or the end point of the movement path. Upon detecting the above start point and end point information, the terminal device may, for example, communicate with the server to generate a recommended path for the user to stroll around the stalls based on the distribution of the stalls in the game scene, for example, through a pathfinding algorithm such as an ant colony algorithm.

Through the above examples, the movement path of the virtual character may be flexibly determined in various ways, so as to better meet the needs of different users for generating different movement paths, improve the user experience in the process of strolling around the stalls, and help to enhance the immersion in the game.

In another example, after switching to the browse mode, the terminal device may hide a virtual interaction element and a virtual transaction node that are displayed on the graphical user interface, in order to make the browse mode have a concise and clear interface effect. The virtual interaction element may include, for example, interactive controls, prompt text, information graphics, etc., on the User Interface (UI) layer. For example, after switching to the browse mode, the terminal device may stop rendering the interactive controls on the game interface such as skill bars, prop bars, and the like, and/or stop rendering the information graphics on the game interface such as "character status", "experience progress" and the like, and/or stop rendering prompt text on the game interface such as chat information, quest prompts, and the like, so as to achieve the effect of hiding the above-mentioned virtual interaction elements.

Figure 4:
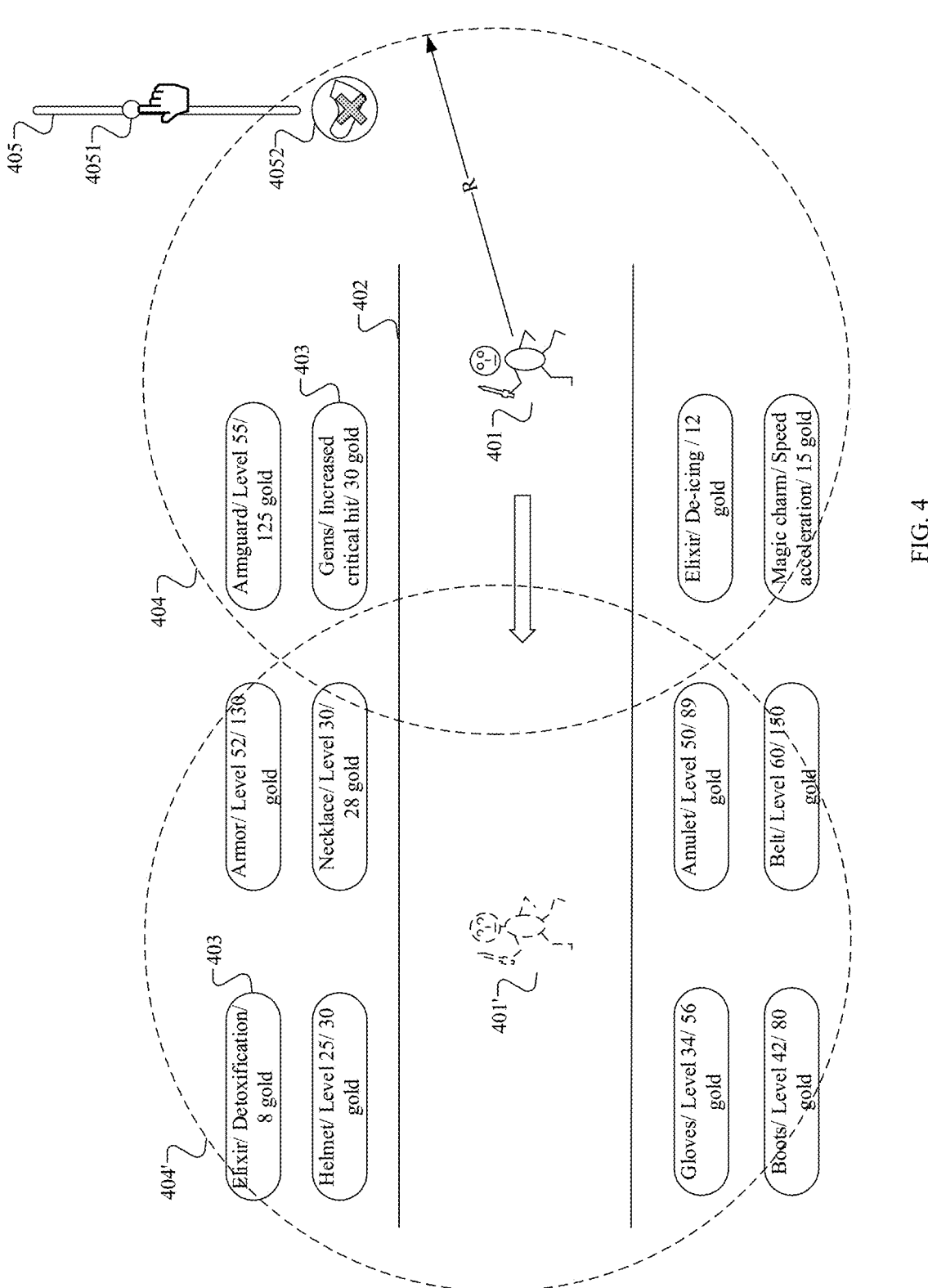
FIG. 4 is a schematic diagram of acquiring and displaying multiple virtual transaction nodes within a preset range on two sides of a movement path according to one or more embodiments of the present disclosure.

In addition, the terminal device may hide each stall, and replace each stall with object information corresponding to the stall. For example, as shown in FIG. 4, for a stall 403 in the game scene, after switching to the browse mode, the terminal device may render a text box corresponding to the stall instead of rendering the graphic appearance of the stall. The text box may include the object information on objects to be traded at the stall 403, for example, "Armor/Level 52/130 gold", "Magic charm/Speed acceleration/15 gold" and so on. The text displayed in the stall 403 shown in FIG. 4 is only an example, in fact, the text box corresponding to the stall 403 may, for example, display the name (such as "helmet", "antidote", etc.), price, type (such as "protective gear", "accessories", "potions", etc.), level, quality (such as "orange" equipment, "purple" equipment), virtual effects (such as "detoxification", "de-icing"), etc., of objects to be traded. The displayed information items may be added flexibly for the object information displayed in the text box according to the actual needs, which is not particularly limited in this exemplary embodiment.

Through the above examples, when switching to the browse mode, most of the virtual interaction elements and the graphical appearance of each virtual transaction node on the game interface may be hidden, avoiding the virtual interaction elements and the graphical appearance of virtual transaction nodes from obscuring the object information of the stalls and the thumbnail map, so as to present the user with a concise and clear game interface, which helps to improve the user's immersion in the process of strolling around the stalls.

In step S220, at least one virtual transaction node in the game scene is acquired, and the object information of the at least one virtual transaction node is determined.

In this embodiment, the terminal device may acquire one or more stalls in the game scene, and determine the object information of these stalls to display the object information to the user, so that the user can understand the details of the object to be traded at each stall. In an example, each virtual transaction node in the game scene may be acquired in one of the following ways.

(a) Acquiring all virtual transaction nodes within the game scene. That is, the terminal device may detect in the whole range of the game scene the stalls set up by the players and the virtual transaction places (such as "Weapon Store", "Medicine Store", "Spirit Beast Store", etc.) fixed in the game scene, and use all the stalls and virtual transaction places detected as the acquired virtual transaction nodes.

(b) Taking a current position of the virtual character controlled by the user in the game scene as a center, and acquiring the stalls set up by the player and the virtual transaction places within a preset radius. For example, if the current position of the virtual character in the game scene "King's City" is a "Restaurant", a length in the game of 50 zhang (e.g., corresponding to ⅓ of the radius of the game scene "King's City") may be used as the preset radius to acquire the stalls and the virtual transaction places within a circular area determined based on the preset radius, and all of the acquired stalls and virtual transaction places serve as the acquired virtual transaction nodes. 1 zhang equals 10 Chinese feet (3.3 m), and this unit may be used to scale the size of the virtual map in the game.

(c) During the movement of the virtual character controlled by the user along the movement path, according to the real-time movement position of the virtual character, the real-time movement position may be used as a center to acquire the stalls set up by the player and the virtual transaction places within a preset range on two sides of the movement path. The preset range may be, for example, a range of 2 zhang in length in the game. That is, for example, the stalls and virtual transaction places, located on two sides of the movement path within a circular range of a radius of 2 zhang centered on the real-time movement position of the virtual character, may be acquired, and all of the acquired stalls and virtual transaction places serve as the acquired virtual transaction nodes. Alternatively, the preset range may be, for example, a range of 200 pixels, which means that, for example, the stalls and virtual transaction places within a range of 200 pixels on two sides of the movement path may be acquired, and all of the required stalls and virtual transaction places serve as the acquired virtual transaction nodes. For example, as shown in FIG. 4, when a virtual character 401 moves along a movement path 402, the real-time movement position of the virtual character 401 may be used as the center to acquire a plurality of stalls 403 within a circular preset range 404 with a radius R on two sides of the movement path 402; and when the real-time movement position of the virtual character 401 changes to the position shown by a virtual character 401', the circular preset range also changes correspondingly to the position shown by a circular preset range 404', so that a plurality of new stalls 403 on two sides of the movement path 402 can be acquired within the circular preset range 404'.

It should be noted that the preset radius R or the preset range described in the above examples may be flexibly adjusted according to actual conditions, and are not limited to the exemplary values listed in the above description. For example, when the game scene where the virtual character is located is a "Small Town", the preset radius R may be correspondingly reduced to 10 zhang, etc., which is not specifically limited by this embodiment.

Through the above examples, the stalls in the game scene can be flexibly acquired in various ways and displayed to the user, thereby providing the user with various experience effects of viewing the stalls, and helping to enhance the user's game immersion.

After at least one virtual transaction node is acquired, the object information of the object to be traded corresponding to each virtual transaction node may be further determined, wherein the object information may be manually input by the player when setting up a stall, or it may be obtained by a game program detecting and analyzing automatically the object to be traded. For example, as mentioned above, the object information may include the name (such as "helmet", "antidote", etc.), price, type (such as "protective gear", "accessories", "potions", etc.), level, quality (such as "orange" equipment, "purple" equipment), virtual effects (such as "detoxification", "de-icing"), etc., of objects to be traded, which are not particularly limited in this embodiment.

In step S230, the virtual character is controlled to move at the preset speed in the game scene according to the movement path.

In this embodiment, the virtual character may be controlled to move at the preset speed along the determined movement path within the game scene to realize the experience of "strolling around stalls". The preset speed may, for example, allow the virtual character to move through ⅐ of the game screen per second. The preset speed may be set according to actual needs, so that neither the virtual character will move too fast and cause the user to have no time to view each stall, nor the virtual character will move too slowly and cause the process of strolling around the stalls to be protracted.

In one example, a virtual movement control related to the movement of the virtual character may be generated in the browse mode, so that the user can control a movement speed of the virtual character through the virtual movement control. For example, as shown in FIG. 4, a virtual movement control may be implemented in a form of a speed adjustment slide slot 405, which may include a speed adjustment slider 4051 that can be dragged and a stop button 4052 that can be clicked. For example, if the user passes through a certain area along the movement path, and finds that there are many stalls of interest that need to be carefully screened, the user may input a speed adjustment command through the virtual movement control 405, so that the virtual character can move at a slower specified speed. For example, by dragging the speed adjustment slider 4051 generated in the game interface, the virtual character can move through ⅑ of the game screen per second. On the other hand, if the user considers that there are no stalls of interest in a certain area, he or she may accelerate the movement speed of the virtual character by inputting a speed adjustment command through the virtual movement control 405, so that the virtual character can pass through the area more quickly. If there is a need to buy a virtual prop at a certain stall, the user may input a stop command through the virtual movement control 405 to stop the virtual character's movement. For example, by dragging the speed adjustment slider 4051 to the bottom of the speed adjustment slide lot or directly clicking a stop button 4052 generated below the speed adjustment slide slot, the movement speed of the virtual character can be reduced to 0, in order to suspend the process of strolling around the stalls, and to provide sufficient time to complete the transaction. Correspondingly, in response to the speed adjustment command or stop command input by the user through the virtual movement control, the virtual character's own movement speed can be changed, e.g., by increasing or decreasing the movement speed, or by stopping the movement.

Through the above examples, the user can freely control the movement speed or stop of the virtual character in the scene, thus realizing a personalized experience of the rhythm of strolling around the stalls, so that the user can better select the virtual prop of the stall to improve the user experience.

In step S240, according to the real-time movement position of the virtual character, the object information of the at least one virtual transaction node is displayed along the movement path.

In this embodiment, as the virtual character moves along the movement path, the object information of the acquired virtual transaction node(s) may be displayed along the movement path (e.g., on two sides of the movement path) according to the real-time movement position of the virtual character. For example, as the virtual character moves forward along the movement path, the game scenes on two sides of the movement path will change accordingly; and correspondingly, each virtual transaction node may be rendered as a text box containing corresponding object information, and each text box is displayed, for example, on two sides of the movement path and along the movement path. In this way, when the real-time movement position of the virtual character changes, the object information of each stall displayed on the game screen is also refreshed, thus bringing the user an experience of strolling around the stalls similar to the reality.

In an example, the object information of the virtual transaction node(s) may be displayed in one of the following ways.

(d) Randomly displaying the object information of the virtual transaction node(s) on two sides of the movement path. That is, the object information of the acquired stalls is randomly generated on two sides of the movement path in a disorderly manner. In this way, there is no relationship between the stall displayed on the game screen and its real position in the game scene, so that the user can be provided with a higher degree of freedom to browse the stalls.

(e) According to a relative position between the virtual transaction node and the movement path in the game scene, the object information of the virtual transaction node(s) is sequentially displayed along the movement path. For example, after determining the movement path and acquiring each stall, the relative position between each stall and the movement path is determined. For example, in the same area, there are three stalls A, B, and C in sequence, the distances of which relative to the movement path are from near to far, and there is also a stall D downstream of the area, then when displaying the object information of each of stalls from A to D along the movement path, the object information of the stalls may be displayed from upstream to downstream in the direction in which the virtual character is moving forward, in order of A, B, C, and D. This way makes the user's experience of strolling around the stalls more similar to the real-life strolling process, which helps to enhance the user's game immersion.

(f) When a large number of virtual transaction nodes are acquired, the virtual transaction nodes may be sorted according to at least one item of information in the object information of the virtual transaction nodes, and according to a result of the sorting, the object information of the virtual transaction nodes may be displayed row by row from proximal to distal to the movement path. As mentioned above, the object information may include, for example, the name, price, type, level, quality, virtual effect of the object, etc., at least one of which may be used to sort the stalls. For example, the server may determine that the player is more sensitive to the price and quality of the object through data analysis. In response to the instructions from the server, the terminal device may sort the stalls based on the price and quality of the object. For example, different weights may be assigned to the two items of information, i.e., the price of the object and quality of the object, and the specific price of the object and the quality of the object may be combined for calculation, so that an object with lower price and higher quality is ranked higher, and an object with higher price and lower quality is ranked lower. After the sorting is completed, the information of various objects may be displayed according to the result of the sorting, such as displaying the information of the objects row by row, for example, displaying the information of the objects that are sorted ahead in the position closer to the movement path, i.e., displaying the information of the objects in the front row, and displaying the information of the objects that are sorted backward in the position farther away from the movement path, i.e., displaying the information of the objects in the back row.

Figure 5:
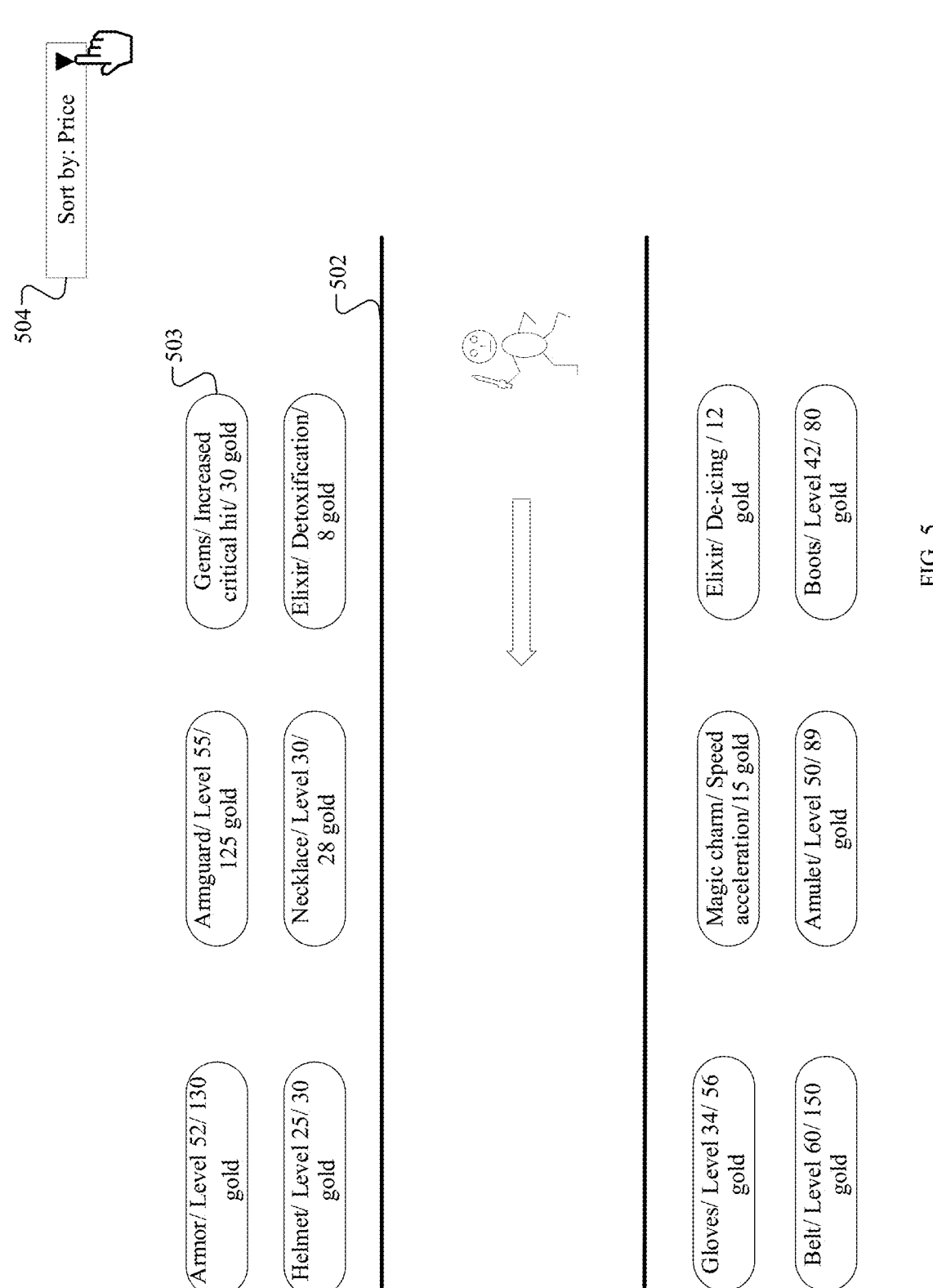
FIG. 5 is a schematic diagram of displaying virtual transaction nodes according to a result of sorting according to one or more embodiments of the present disclosure.

For example, as shown in FIG. 5, the user may input sorting condition information in a sorting condition information input box 504 in the form of manual input or by selecting it from a drop-down menu. For example, as shown in FIG. 5, the user may choose to sort the stalls 503 in ascending order according to the "Price" information item. The sorted and displayed stalls may be, for example, as shown in FIG. 5, with the stalls 503 corresponding to the lower-priced objects being closer to the movement path 502, and the stalls corresponding to the higher-priced objects being farther away from the movement path 502. It should be noted that, depending on the actual needs, it is also possible to perform a descending order based on the price, and it is also possible to sort the various stalls 503 based on more than one information item, such as sorting based on the "Price" and "Quality" information items of the objects as described above, etc., which are not particularly limited in this example. In this way, high-quality and low-priced objects can be displayed first, thereby reducing the difficulty for the user to select the desired objects, improving the efficiency of shopping at stalls, and thus helping to improve user experience.

In a further example, the object information may also be displayed in two columns on two sides of the movement path in an aligned manner. For example, as shown in FIG. 5, the object information of the stalls 503 may be displayed as two columns on two sides of the movement path. In this way, the object information of the stalls can be displayed to the user in a regular manner, and the difficulty for the user to read the information from two columns of object information will be correspondingly reduced compared with the situation of multiple columns of object information, which helps to reduce the difficulty for the user to select the desired objects and improve the user experience.

In a further example, when a large number of virtual transaction nodes are acquired, offset processing may be performed on object information whose display positions are adjacent, so that the object information will not be obscured from each other when displayed. For example, the terminal device can flexibly set the size of the text box used to display the object information according to the content of the object information to be displayed, and set an appropriate offset according to the size of the text box, so that when displaying the text boxes of the object information, they can be separated from each other due to the existence of the set offset, and do not block each other to affect viewing. In this way, the object information of each stall can be displayed to the user in a clear and orderly manner, thereby helping to improve the browsing efficiency of the user when strolling around the stalls.

In a further example, the terminal device may also receive screening information input by the user, and screen the virtual transaction nodes according to the screening information. The screening information may be specific information related to at least one item of information in the object information. For example, the user may only be interested in orange equipment in the Protective Gear category and priced under 200 gold, in which case the Browse Mode can provide a screening information input screen where the user can manually enter or select from a drop-down menu the appropriate screening information, e.g., "Protective Gear", "Orange", "Less Than 200 Gold", to specify the specific object the user is interested in using this screening information. After receiving the screening information, the terminal device may then screen among the acquired stalls according to the screening information, and obtain stall(s) that meets or meet the requirements of the screening information. Afterwards, the terminal device may display the object information of the screened virtual transaction node(s) at the position closest to the movement path.

Figure 6:
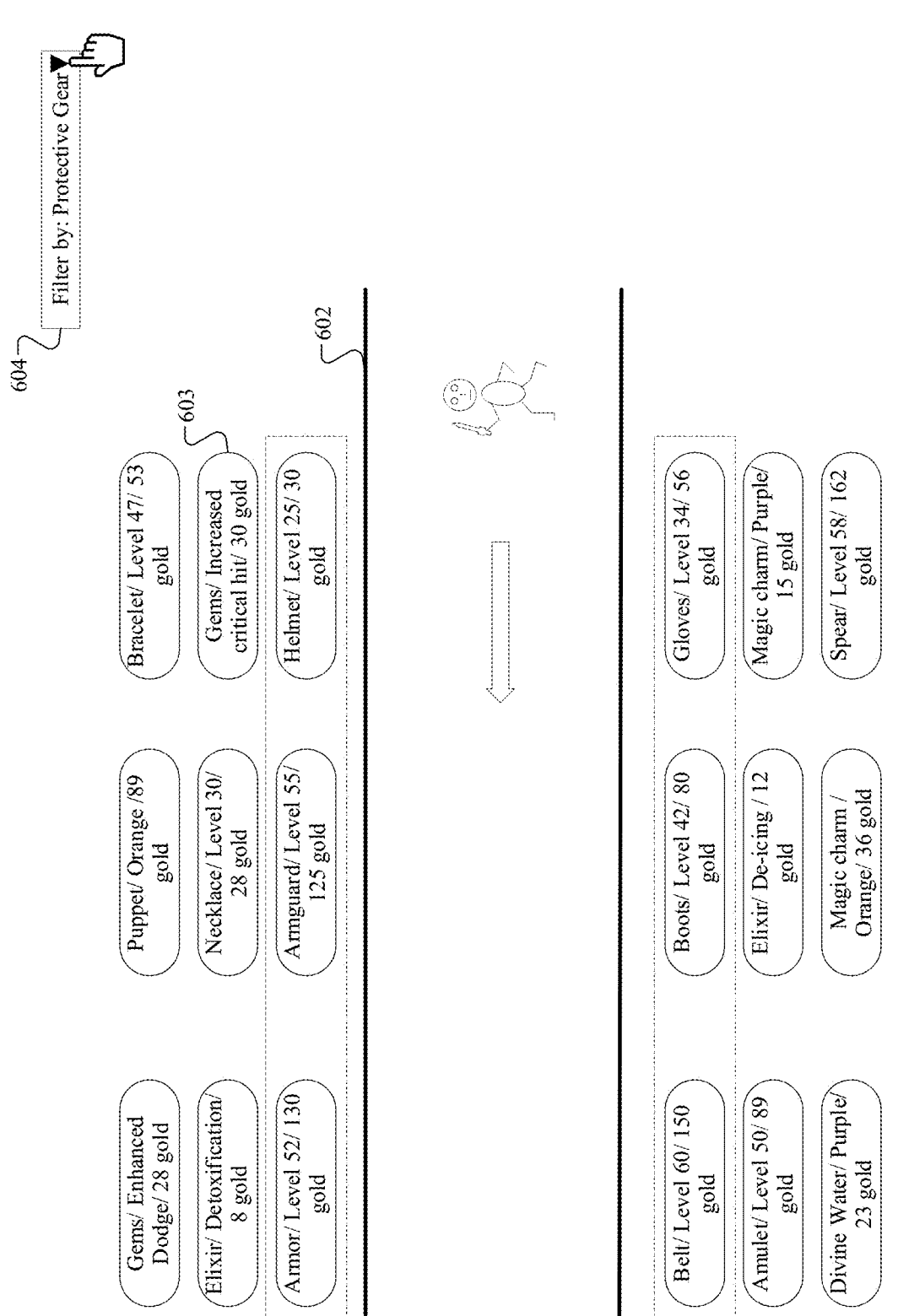
FIG. 6 is a schematic diagram of displaying virtual transaction nodes based on screening information according to one or more embodiments of the present disclosure.

For example, as shown in FIG. 6, the user may input screening condition information in a screening condition information input box 604 either manually or by selecting it from a drop-down menu. For example, as shown in FIG. 6, the user may choose to set the screening condition information to "Protective Gear". The terminal device may then screen out the stalls in which the "Protective gear" is to be traded among the various stalls 603 according to the screening information, and display the object information corresponding to the screened stalls in which the "Protective Gear" is to be traded in a position closest to the movement path 602 as shown by the dotted box in FIG. 6. It should be noted that, the screening condition information may also be set to more than one item of information according to actual needs, for example, the screening condition information may be set to "Protective Gear", "Orange", "Less Than 200 Gold", etc. as described above, which is not specifically limited in this example. In this way, the specific objects of interest can be prioritized and displayed, enabling the user to browse the stalls of interest more quickly, thus helping to improve the efficiency of strolling around the stalls and enhance the user experience.

Figure 7:
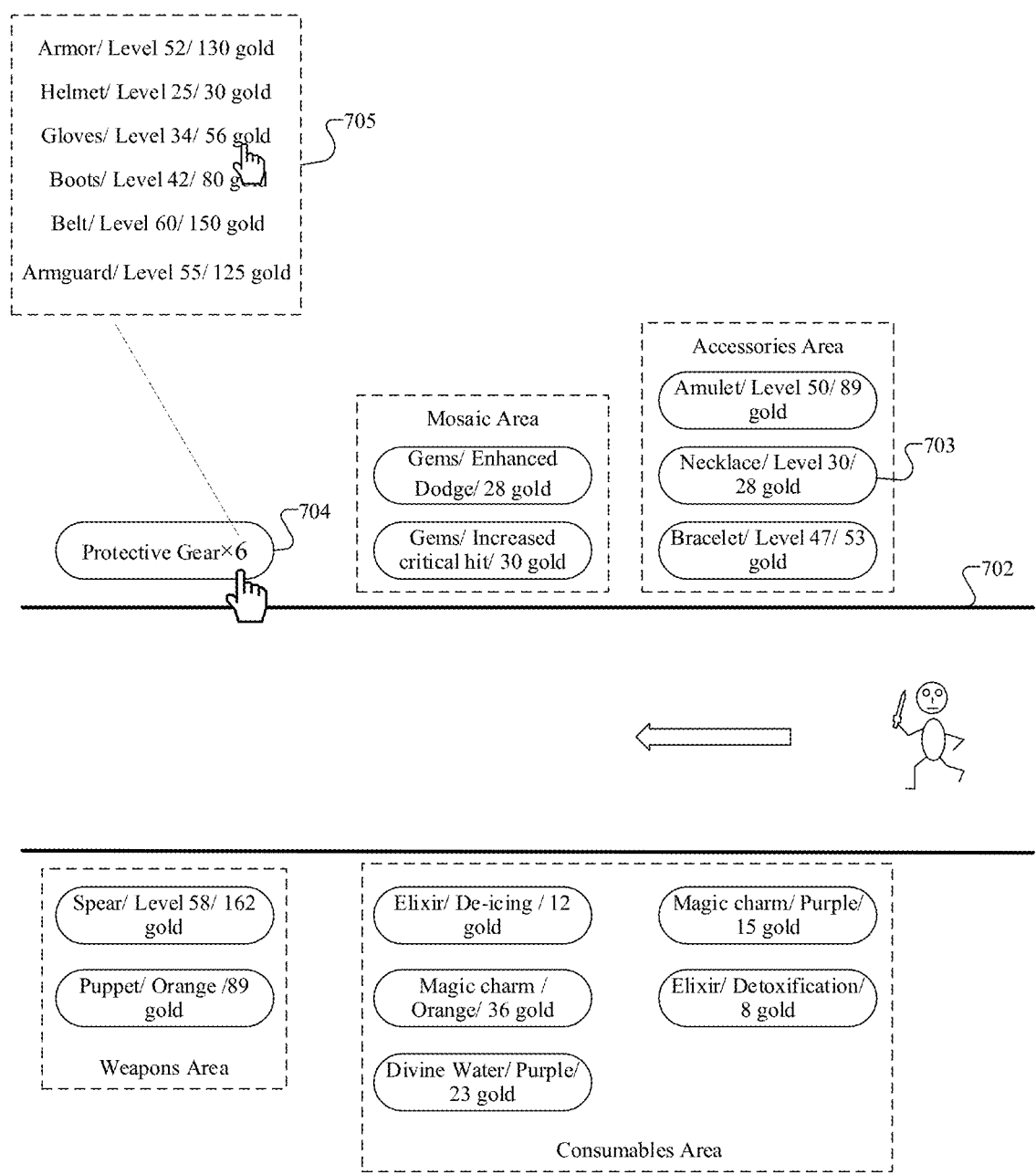
FIG. 7 is schematic diagram of displaying virtual transaction nodes according to transaction types according to one or more embodiments of the present disclosure.

In an example, the terminal device may also determine transaction type of each acquired virtual transaction node, e.g., determining the transaction type according to at least one item of information in the object information of each stall. For example, according to the "Quality" information in the object information, it can be determined which stalls' transaction type is orange equipment, and which stalls' transaction type is purple equipment, etc.; and according to the "Type" information in the object information, it can be determined which stalls' transaction type is protective gear, and which stalls' transaction type is accessories, etc. In this way, when a large number of virtual transaction nodes are acquired, and it is difficult to offset the object information at adjacent display positions, for example, as shown in FIG. 7, the object information of N virtual transaction nodes belonging to the same transaction type may be combined and displayed as a single item of object information, and the number of items combined may also be displayed. For example, the object information of 6 stalls used to trade "Protective Gear" may be combined and displayed as "Protective Gear×6". Alternatively, it is also possible to gather the object information of N virtual transaction nodes belonging to the same transaction type in the same area for display, for example, to gather the object information of multiple stalls used to trade "Accessories" in the "Accessories Area" on one side of the movement path for display, and to gather the object information of multiple stalls used to trade "Consumables" in the "Consumables Area" on one side of the movement path. The above-mentioned N is a natural number greater than 1 and can be flexibly set according to actual needs. For example, when a large number of virtual transaction nodes are acquired, N is set to 6, or when it is desired to show a large number of purple equipment to the user in a centralized manner, etc., which is not specifically limited in this example.

For example, as shown in FIG. 7, the stalls may be gathered for display according to the "Type" information in the object information of the stalls 703. For example, consumables such as "Magic charm", "Elixir", and "Divine Water" may be gathered for display in the "Consumables Area" on one side of the movement path 702 as shown in the dotted box; and accessories such as "Amulet", "Necklace", and "Bracelet" may be gathered for display in the "Accessories Area" on one side of the movement path 702 as shown in the dotted box, and the like. In addition, for example, the object information of 6 stalls for trading "Protective Gear" may also be combined and displayed as a single item of object information 704, and the single item of object information 704 may be displayed in the form of, for example, "Protective Gear×6". When the user clicks the text box displaying the single item of object information 704, a secondary display menu 705 may pop up, and the detailed object information for each of the 6 objects in "Protective Gears" that have been combined for display may be displayed in the secondary display menu 705. The user may carry out the transaction operation by clicking on the detailed object information of the corresponding object in "Protective Gears". Through the above examples, the object information can be displayed in a concise and clear form, or the object information can be displayed in clusters, so that the user can obtain the object information of each stall more intuitively and quickly when browsing the object information during the process of strolling around the stalls, which helps the user to find the object of interest more conveniently, and helps to improve the shopping efficiency of strolling around the stalls and to enhance the user experience.

In one example, when the user selects the desired object, the object information of the desired object may be selected by touching the touch screen of the terminal device. In response to the touch operation on the displayed object information, the terminal device may perform the object transaction operation corresponding to the object information, so that the user can conduct the corresponding object transaction with the stallholder. In a further example, after the object transaction operation is performed, the movement speed of the virtual character may be reduced or the virtual character may be controlled to stop moving, so that the user can view and confirm the objects traded, which prevents the user from missing the objects of the following stalls due to continuous traveling movement. Through the above examples, the user is provided with a fast way to trade objects, so that the user can "buy as he/she strolls" and "confirm purchase" in the process of strolling around the stalls, which is more similar to the shopping experience in reality, and thus helps to enhance user immersion.

In a further example, after reducing the movement speed of the virtual character or controlling the virtual character to stop moving, the user may further control the movement of the virtual character through the virtual movement control as described above. For example, the user may input the speed adjustment command through the virtual movement control, such as by dragging the speed adjustment slider generated in the game interface, so that the virtual character moves at a slower specified speed or accelerates the movement speed. The user may also input the stop command through the virtual movement control, such as, by dragging the speed adjustment slider to the bottom of the slide slot or directly clicking the stop button generated below the speed adjustment slide slot, so that the virtual character stops moving. Correspondingly, in response to the speed adjustment command or stop command input by the user through the virtual movement control, the virtual character can change its own movement speed, for example, increase or decrease the movement speed, or stop moving. In this way, a personalized experience of the rhythm of strolling around the stalls can be realized for the user, which helps to enhance user experience.

It should be noted that although the various steps of the methods of the present disclosure are depicted in the drawings in a particular order, this does not require or imply that the steps must be performed in that particular order, or that all of the steps shown must be performed to achieve the desired the results. Additionally or alternatively, certain steps may be omitted, multiple steps may be combined into one step for execution, and/or one step may be decomposed into multiple steps for execution, etc.

Figure 8:
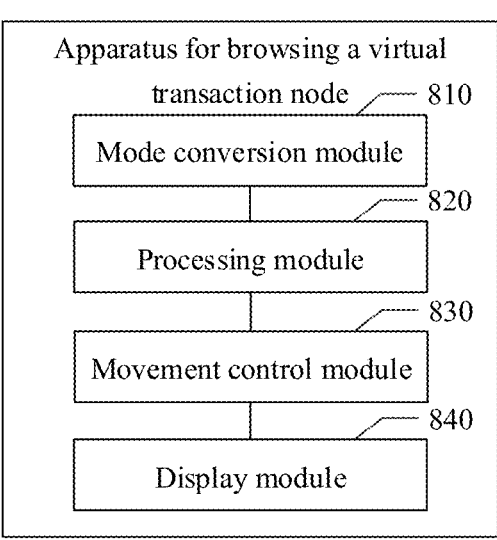
FIG. 8 is a block diagram of an apparatus for displaying a virtual transaction node according to one or more embodiments of the present disclosure.

Further, in this exemplary embodiment, an apparatus for displaying a virtual transaction node is also provided. This apparatus for displaying a virtual transaction node may be applied to a terminal device. The terminal device provides a graphical user interface, and the graphical user interface displays at least a virtual character in a game scene. As shown in FIG. 8, the apparatus for displaying a virtual transaction node 800 may include a mode conversion module 810, a processing module 820, a movement control module 830 and a display module 840.

The mode conversion module 810 is configured to switch to a browse mode in response to a browse mode switch command, and determine a movement path of the virtual character in the game scene.

The processing module 820 is configured to acquire at least one virtual transaction node in the game scene, and determine object information of the at least one virtual transaction node.

The movement control module 830 is configured to control the virtual character to move at a preset speed in the game scene according to the movement path.

The display module 840 is configured to display, according to a real-time movement position of the virtual character, the object information of the at least one virtual transaction node along the movement path.

In some embodiments of the present disclosure, the mode conversion module 810 may be configured to determine the movement path according to received path information.

In some embodiments of the present disclosure, the received path information includes: information on a path line drawn by a user, or start and end point information input by a user.

In some embodiments of the present disclosure, the processing module 820 may be configured to acquire all virtual transaction nodes within the game scene; or to acquire the at least one virtual transaction node within a preset radius centered on a current position of the virtual character in the game scene; or to acquire the at least one virtual transaction node within a preset range on two sides of the movement path according to the real-time movement position of the virtual character.

In some embodiments of the present disclosure, the mode conversion module 810 may further be configured to hide the at least one virtual transaction node and a virtual interaction element that are displayed on the graphical user interface in the browse mode, and generate a virtual movement control related to a movement of the virtual character.

In some embodiments of the present disclosure, the movement control module 830 may further be configured to change, in response to a speed adjustment command input through the virtual movement control, a movement speed of the virtual character; or to control, in response to a stop command input through the virtual movement control, the virtual character to stop moving.

In some embodiments of the present disclosure, the display module 840 may be configured to randomly display the object information of the at least one virtual transaction node on two sides of the movement path; or to display sequentially, according to a relative position between a virtual transaction node of the at least one virtual transaction node and the movement path in the game scene, the object information of the at least one virtual transaction node along the movement path; or to sort the at least virtual transaction node according to at least one item of information in the object information of the at least one virtual transaction node, and according to a result of the sorting, display the object information of the at least one virtual transaction node row by row from proximal to distal to the movement path.

In some embodiments of the present disclosure, the display module 840 may further be configured to arrange and align the object information in two columns along two sides of the movement path.

In some embodiments of the present disclosure, the display module 840 may further be configured to offset the object information at adjacent display positions, so that the object information does not block each other when displayed.

In some embodiments of the present disclosure, the display module 840 may further be configured to receive screening information, and perform screening on the at least one virtual transaction node according to the screening information; and display the object information of a screened virtual transaction node at a position closest to the movement path.

In some embodiments of the present disclosure, the display module 840 may further be configured to determine a transaction type of each virtual transaction node of the at least one virtual transaction node; and combine and display the object information of N virtual transaction nodes belonging to a same transaction type as a single item of object information; or collect and display the object information of N virtual transaction nodes belonging to a same transaction type in a same area; wherein N is a natural number greater than 1.

In some embodiments of the present disclosure, the processing module 820 may further be configured to perform an object transaction operation corresponding to the object information in response to a touch operation on the displayed object information.

In some embodiments of the present disclosure, the movement control module 830 may further be configured to reduce a movement speed of the virtual character, or control the virtual character to stop moving after performing the object transaction operation corresponding to the object information.

In some embodiments of the present disclosure, the browse mode further includes a virtual movement control. The movement control module 830 may be configured to, after reducing the movement speed of the virtual character or after controlling the virtual character to stop moving, change the movement speed of the virtual character in response to a speed adjustment command input through the virtual movement control, or control the virtual character to stop moving in response to a stop command input through the virtual movement control.

The specific details of each module or unit of the above apparatus for displaying a virtual transaction node have been described in detail in the corresponding method for displaying a virtual transaction node, and therefore will not be repeated here.

Figure 9:
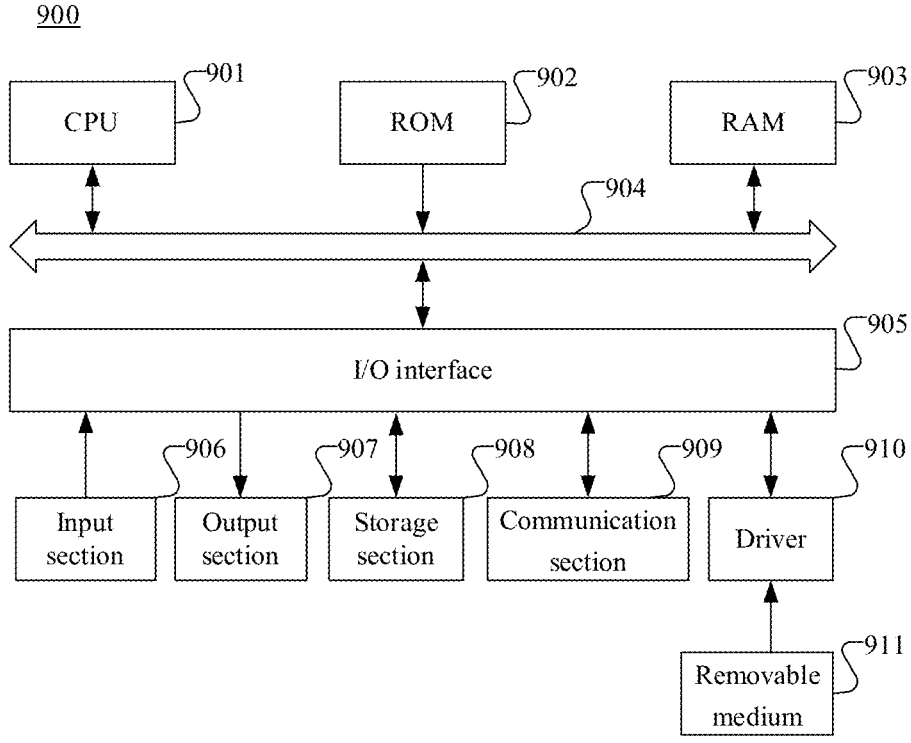
FIG. 9 is a schematic structural diagram of a computer system of an electronic device applicable for implementing one or more embodiments of the present disclosure.

FIG. 9 shows a schematic structural diagram of a computer system of an electronic device applicable for implementing the embodiments of the present disclosure.

It should be noted that a computer system 900 of the electronic device shown in FIG. 9 is only an example, and should not limit the functions and application scope of the embodiments of the present disclosure.

As shown in FIG. 9, the computer system 900 includes a central processing unit (CPU) 901 which can perform various appropriate actions and processes according to programs stored in a read-only memory (ROM) 902 or loaded into a random access memory (RAM) 903 from a storage section 908. Various programs and data required for system operation are also stored in the RAM 903. The CPU 901, ROM 902, and RAM 903 are connected to each other via a bus 904. An input/output (I/O) interface 905 is also connected to the bus 904.

The following components are connected to the I/O interface 905: an input section 906 including a keyboard, a mouse, etc.; an output section 907 including a cathode ray tube (CRT) display, a liquid crystal display (LCD), and a speaker, etc.; the storage section 908 including a hard disk, etc.; and a communication section 909 including a network interface card such as a LAN card, a modem, or the like. The communication section 909 performs communication processing via a network such as the Internet. A driver 910 is also connected to the I/O interface 905 as needed. A removable medium 911 such as a magnetic disk, optical disk, magneto optical disk, semiconductor memory, etc. is mounted on the driver 910 as needed, so that a computer program read therefrom is installed into the storage section 908 as needed.

In particular, according to an embodiment of the present disclosure, the processes described below with reference to the flowcharts can be implemented as computer software programs. For example, embodiments of the present disclosure provide a computer program product, which includes a computer program carried on a computer-readable medium, where the computer program includes program codes for executing the methods shown in the flowcharts. In such an embodiment, the computer program may be downloaded and installed from a network via the communication section 909, and/or installed from the removable medium 911. When the computer program is executed by the central processing unit (CPU) 901, various functions defined in the method and device of the present disclosure are performed.

For example, a graphical user interface is provided through a terminal device, wherein the graphical user interface displays at least a virtual character in a game scene. The method includes:

switching to a browse mode in response to a browse mode switch command, and determining a movement path of the virtual character in the game scene;

acquiring at least one virtual transaction node in the game scene, and determining object information of the at least one virtual transaction node;

controlling the virtual character to move at a preset speed in the game scene according to the movement path; and displaying, according to a real-time movement position of the virtual character, the object information of the at least one virtual transaction node along the movement path.

In some embodiments of the present disclosure, determining the movement path of the virtual character in the game scene includes: determining the movement path according to received path information.

In some embodiments of the present disclosure, the received path information includes: information on a path line drawn by a user, or start and end point information input by a user.

In some embodiments of the present disclosure, acquiring the at least one virtual transaction node in the game scene includes: acquiring all virtual transaction nodes within the game scene; or acquiring the at least one virtual transaction node within a preset radius centered on a current position of the virtual character in the game scene; or acquiring the at least one virtual transaction node within a preset range on two sides of the movement path according to the real-time movement position of the virtual character.

In some embodiments of the present disclosure, the method further includes: hiding the at least one virtual transaction node and a virtual interaction element that are displayed on the graphical user interface in the browse mode, and generating a virtual movement control related to a movement of the virtual character.

In some embodiments of the present disclosure, the method further includes: changing, in response to a speed adjustment command input through the virtual movement control, a movement speed of the virtual character; or controlling, in response to a stop command input through the virtual movement control, the virtual character to stop moving.

In some embodiments of the present disclosure, displaying the object information of the at least one virtual transaction node along the movement path includes: randomly displaying the object information of the at least one virtual transaction node on two sides of the movement path; or sequentially displaying, according to a relative position between a virtual transaction node of the at least one virtual transaction node and the movement path in the game scene, the object information of the at least one virtual transaction node along the movement path; or sorting the at least virtual transaction node according to at least one item of information in the object information of the at least one virtual transaction node, and according to a result of the sorting, displaying the object information of the at least one virtual transaction node row by row from proximal to distal to the movement path.

In some embodiments of the present disclosure, the method further includes: arranging and aligning the object information in two columns along two sides of the movement path.

In some embodiments of the present disclosure, the method further includes: offsetting the object information at adjacent display positions, so that the object information does not block each other when displayed.

In some embodiments of the present disclosure, the method further includes: receiving screening information, and performing screening on the at least one virtual transaction node according to the screening information; and displaying the object information of a screened virtual transaction node at a position closest to the movement path.

In some embodiments of the present disclosure, the method further includes: determining a transaction type of each virtual transaction node of the at least one virtual transaction node; and combining and displaying the object information of N virtual transaction nodes belonging to a same transaction type as a single item of object information; or collecting and displaying the object information of N virtual transaction nodes belonging to a same transaction type in a same area; wherein N is a natural number greater than 1.

In some embodiments of the present disclosure, the method further includes: in response to a touch operation on the displayed object information, performing an object transaction operation corresponding to the object information.

In some embodiments of the present disclosure, after performing the object transaction operation corresponding to the object information, the method further includes: reducing a movement speed of the virtual character, or controlling the virtual character to stop moving.

In some embodiments of the present disclosure, the browse mode further includes a virtual movement control. After reducing the movement speed of the virtual character or after controlling the virtual character to stop moving, the method further includes: in response to a speed adjustment command input through the virtual movement control, changing the movement speed of the virtual character; or in response to a stop command input through the virtual movement control, controlling the virtual character to stop moving.

Through the above method, on the one hand, the virtual transaction node in the game is displayed along the movement path of the virtual character, so that the user can have a realistic experience of shopping and viewing stalls in the game scene similar to that in real life, which realizes the experience of "buying while strolling" similar to reality, and in turn, helps to improve the user's game immersion. On the other hand, the object information of the virtual transaction node is displayed in a regular manner along the virtual character's movement path within the game scene, which avoids the need for the user to detach from the game scene and enter the store's browsing interface to view the stall information, and further improves the user's immersion.

In another aspect, the present disclosure further provides a computer-readable medium, which may be contained in the electronic device as described in the above embodiments; or may be separate and not assembled into the electronic device. The computer-readable medium carries one or more programs that, when the one or more programs are executed by one such electronic device, cause the electronic device to implement the method as described in the above embodiments.

For example, a graphical user interface is provided through a terminal device, wherein the graphical user interface displays at least a virtual character in a game scene. The method includes:

switching to a browse mode in response to a browse mode switch command, and determining a movement path of the virtual character in the game scene;

acquiring at least one virtual transaction node in the game scene, and determining object information of the at least one virtual transaction node;

controlling the virtual character to move at a preset speed in the game scene according to the movement path; and displaying, according to a real-time movement position of the virtual character, the object information of the at least one virtual transaction node along the movement path.

In some embodiments of the present disclosure, determining the movement path of the virtual character in the game scene includes: determining the movement path according to received path information.

In some embodiments of the present disclosure, the received path information includes: information on a path line drawn by a user, or start and end point information input by a user.

In some embodiments of the present disclosure, acquiring the at least one virtual transaction node in the game scene includes: acquiring all virtual transaction nodes within the game scene; or acquiring the at least one virtual transaction node within a preset radius centered on a current position of the virtual character in the game scene; or acquiring the at least one virtual transaction node within a preset range on two sides of the movement path according to the real-time movement position of the virtual character.

In some embodiments of the present disclosure, the method further includes: hiding the at least one virtual transaction node and a virtual interaction element that are displayed on the graphical user interface in the browse mode, and generating a virtual movement control related to a movement of the virtual character.

In some embodiments of the present disclosure, the method further includes: changing, in response to a speed adjustment command input through the virtual movement control, a movement speed of the virtual character; or controlling, in response to a stop command input through the virtual movement control, the virtual character to stop moving.

In some embodiments of the present disclosure, displaying the object information of the at least one virtual transaction node along the movement path includes: randomly displaying the object information of the at least one virtual transaction node on two sides of the movement path; or sequentially displaying, according to a relative position between a virtual transaction node of the at least one virtual transaction node and the movement path in the game scene, the object information of the at least one virtual transaction node along the movement path; or sorting the at least virtual transaction node according to at least one item of information in the object information of the at least one virtual transaction node, and according to a result of the sorting, displaying the object information of the at least one virtual transaction node row by row from proximal to distal to the movement path.

In some embodiments of the present disclosure, the method further includes: arranging and aligning the object information in two columns along two sides of the movement path.

In some embodiments of the present disclosure, the method further includes: offsetting the object information at adjacent display positions, so that the object information does not block each other when displayed.

In some embodiments of the present disclosure, the method further includes: receiving screening information, and performing screening on the at least one virtual transaction node according to the screening information; and displaying the object information of a screened virtual transaction node at a position closest to the movement path.

In some embodiments of the present disclosure, the method further includes: determining a transaction type of each virtual transaction node of the at least one virtual transaction node; and combining and displaying the object information of N virtual transaction nodes belonging to a same transaction type as a single item of object information; or collecting and displaying the object information of N virtual transaction nodes belonging to a same transaction type in a same area; wherein N is a natural number greater than 1.

In some embodiments of the present disclosure, the method further includes: in response to a touch operation on the displayed object information, performing an object transaction operation corresponding to the object information.

In some embodiments of the present disclosure, after performing the object transaction operation corresponding to the object information, the method further includes: reducing a movement speed of the virtual character, or controlling the virtual character to stop moving.

In some embodiments of the present disclosure, the browse mode further includes a virtual movement control. After reducing the movement speed of the virtual character or after controlling the virtual character to stop moving, the method further includes: in response to a speed adjustment command input through the virtual movement control, changing the movement speed of the virtual character; or in response to a stop command input through the virtual movement control, controlling the virtual character to stop moving.

Through the above method, on the one hand, the virtual transaction node in the game is displayed along the movement path of the virtual character, so that the user can have a realistic experience of shopping and viewing stalls in the game scene similar to that in real life, which realizes the experience of "buying while strolling" similar to reality, and in turn, helps to improve the user's game immersion. On the other hand, the object information of the virtual transaction node is displayed in a regular manner along the virtual character's movement path within the game scene, which avoids the need for the user to detach from the game scene and enter the store's browsing interface to view the stall information, and further improves the user's immersion.

It should be noted that the computer-readable medium shown in the present disclosure may be a computer-readable signal medium or a computer-readable storage medium or any combination thereof. The computer-readable storage medium may be, for example, but not limited to, an electrical, magnetic, optical, electromagnetic, infrared, or semiconductor system, apparatus, or device, or any combination thereof. More specific examples of computer-readable storage medium may include, but are not limited to, electrical connections with one or more wires, portable computer diskettes, hard disks, random access memory (RAM), read-only memory (ROM), erasable programmable read-only memory (EPROM or flash memory), optical fiber, portable compact disk read-only memory (CD-ROM), optical storage device, magnetic storage device, or any suitable combination thereof. In the present disclosure, the computer-readable storage medium may be any tangible medium that contains or stores a program that can be used by or in conjunction with an instruction execution system, apparatus, or device. In the present disclosure, the computer-readable signal medium may include a data signal propagated in baseband or as part of a carrier wave, carrying computer-readable program code therein. Such propagated data signals may be in a variety forms, including, but not limited to, electromagnetic signals, optical signals, or any suitable combination thereof. The computer-readable signal medium may also be any computer-readable medium other than the computer-readable storage medium, and the computer-readable medium can send, propagate, or transmit a program for use by or in conjunction with an instruction execution system, apparatus, or device. The program code contained on the computer-readable medium may be transmitted using any appropriate medium, including, but not limited to: wireless, wire, optical cable, RF, etc., or any suitable combination thereof.

The flowchart and block diagrams in the drawings illustrate the architecture, functionality, and operation of possible implementations of systems, methods and computer program products according to various embodiments of the present disclosure. In this regard, each block in a flowchart or block diagram may represent a module, program segment, or portion of code that includes one or more executable instructions to perform a specific logical function. It should also be noted that, in some alternative implementations, the functions noted in the block may occur out of the order noted in the drawings. For example, two blocks shown in succession may, in fact, be executed substantially concurrently, or they may sometimes be executed in the reverse order, depending upon the functionality involved. It should also be noted that each block in the block diagrams or flowcharts, and combinations of blocks in the block diagrams or flowcharts, can be implemented by a dedicated hardware-based system that performs the specified function or operation, or can be implemented by a combination of dedicated hardware and computer instructions.

It should be understood that the present disclosure is not limited to the precise constructions which have been described above and shown in the drawings, and various modifications and changes may be made without departing from the scope thereof. The scope of the present disclosure is limited only by the appended claims.

What is claimed is:

1. A method for displaying a virtual transaction node, comprising:
    providing, by a terminal device, a graphical user interface, wherein the graphical user interface displays a virtual character in a game scene;
    entering a browse mode in response to a browse mode switch command, and determining a movement path of the virtual character in the game scene in the browse mode;
    acquiring at least one virtual transaction node in the game scene, and determining object information of the at least one virtual transaction node;
    controlling the virtual character to move at a preset speed in the game scene according to the movement path; and
    displaying, according to a real-time movement position of the virtual character, the object information of the at least one virtual transaction node along the movement path.

2. The method of claim 1, wherein determining the movement path of the virtual character in the game scene comprises:
    determining the movement path according to received path information.

3. The method of claim 2, wherein the received path information comprises: information on a path line drawn by a user, or start and end point information input by a user.

4. The method of claim 1, wherein acquiring the at least one virtual transaction node in the game scene comprises:

acquiring all virtual transaction nodes within the game scene, wherein the at least one virtual transaction node comprises all the virtual transaction nodes within the game scene; or acquiring the at least one virtual transaction node within a preset radius centered on a current position of the virtual character in the game scene; or acquiring the at least one virtual transaction node within a preset range on two sides of the movement path according to the real-time movement position of the virtual character.

5. The method of claim 1, further comprising:

hiding the at least one virtual transaction node and a virtual interaction element that are displayed on the graphical user interface in the browse mode, and generating a virtual movement control related to a movement of the virtual character.

6. The method of claim 5, further comprising:

changing, in response to a speed adjustment command input through the virtual movement control, a movement speed of the virtual character; or controlling, in response to a stop command input through the virtual movement control, the virtual character to stop moving.

7. The method of claim 1, wherein displaying the object information of the at least one virtual transaction node along the movement path comprises:

randomly displaying the object information of the at least one virtual transaction node on two sides of the movement path; or sequentially displaying, according to a relative position between a virtual transaction node of the at least one virtual transaction node and the movement path in the game scene, the object information of the at least one virtual transaction node along the movement path; or sorting the at least virtual transaction node according to at least one item of information in the object information of the at least one virtual transaction node, and according to a result of the sorting, displaying the object information of the at least one virtual transaction node row by row from proximal to distal to the movement path.

8. The method of claim 7, further comprising:

arranging and aligning the object information in two columns along two sides of the movement path.

9. The method of claim 8, further comprising:

offsetting the object information at adjacent display positions, wherein offset object information at the adjacent display positions does not block each other when displayed.

10. The method of claim 7, further comprising:

receiving screening information, and performing screening on the at least one virtual transaction node according to the screening information; and displaying the object information of a screened virtual transaction node at a position closest to the movement path.

11. The method of claim 1, further comprising:

determining a transaction type of each virtual transaction node of the at least one virtual transaction node; and combining and displaying the object information of N virtual transaction nodes belonging to a same transaction type as a single item of object information; or collecting and displaying the object information of N virtual transaction nodes belonging to a same transaction type in a same area;

wherein N is a natural number greater than 1.

12. The method of claim 1, further comprising:

in response to a touch operation on the displayed object information, performing an object transaction operation corresponding to the object information.

13. The method of claim 12, wherein, after performing the object transaction operation corresponding to the object information, the method further comprises:

reducing a movement speed of the virtual character, or controlling the virtual character to stop moving.

14. The method of claim 13, wherein the browse mode further provides a virtual movement control; and wherein, after reducing the movement speed of the virtual character or after controlling the virtual character to stop moving, the method further comprises:

in response to a speed adjustment command input through the virtual movement control, changing the movement speed of the virtual character; or in response to a stop command input through the virtual movement control, controlling the virtual character to stop moving.

15. An electronic device comprising:

a memory; and a processor coupled to the memory, wherein the processor is configured to;

provide a graphical user interface, wherein the graphical user interface displays a virtual character in a game scene;

enter a browse mode in response to a browse mode switch command, and determine a movement path of the virtual character in the game scene in the browse mode;

acquire at least one virtual transaction node in the game scene, and determine object information of the at least one virtual transaction node;

control the virtual character to move at a preset speed in the game scene according to the movement path; and display, according to a real-time movement position of the virtual character, the object information of the at least one virtual transaction node along the movement path.

16. A non-transitory computer-readable storage medium having stored thereon a computer program, wherein the computer program, when executed by a processor, causes the processor to:

provide a graphical user interface, wherein the graphical user interface displays a virtual character in a game scene;

enter a browse mode in response to a browse mode switch command, and determine a movement path of the virtual character in the game scene in the browse mode;

acquire at least one virtual transaction node in the game scene, and determine object information of the at least one virtual transaction node;

control the virtual character to move at a preset speed in the game scene according to the movement path; and display, according to a real-time movement position of the virtual character, the object information of the at least one virtual transaction node along the movement path.

17. The method of claim 5, wherein hiding the virtual interaction element comprises:

stopping rendering the virtual interaction element, wherein the virtual interaction element comprises at least one of: an interactive control, prompt text, or information graphic.

18. The method of claim 5, further comprising:
displaying the object information corresponding to the at
least one virtual transaction node instead of displaying
the at least one virtual transaction node.

19. The method of claim 18, wherein displaying the object
information corresponding to the at least one virtual trans-
action node instead of displaying the at least one virtual
transaction node comprises:
rendering a text box corresponding to the at least one
virtual transaction node instead of rendering a graphic
appearance of the at least one virtual transaction node,
wherein the text box comprises the object information
corresponding to the at least one virtual transaction
node.

20. The method of claim 6, wherein the virtual movement
control is a speed adjustment slide slot that comprises at
least one of: a speed adjustment slider or a stop button; and
wherein the method further comprises:
receiving the speed adjustment command input by a user
dragging the speed adjustment slider; or
receiving the stop command input by a user dragging the
speed adjustment slider to a bottom of the speed
adjustment slide lot or clicking the stop button.

* * * * *

24